(12) United States Patent
Vort et al.

(10) Patent No.: US 11,876,761 B2
(45) Date of Patent: *Jan. 16, 2024

(54) SYSTEMS AND METHODS FOR VISUAL CUE BASED MESSAGING

(71) Applicants: Douglas Vort, Truckee, CA (US); Rachel Beth Williams, Truckee, CA (US); Ella Ashlyn Williams, Truckee, CA (US); Lauren Elizabeth Vort, Truckee, CA (US); Miles Christopher Williams, Truckee, CA (US); Adam David Vort, Truckee, CA (US)

(72) Inventors: Douglas Vort, Truckee, CA (US); Rachel Beth Williams, Truckee, CA (US); Ella Ashlyn Williams, Truckee, CA (US); Lauren Elizabeth Vort, Truckee, CA (US); Miles Christopher Williams, Truckee, CA (US); Adam David Vort, Truckee, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/337,239

(22) Filed: Jun. 19, 2023

(65) Prior Publication Data

US 2023/0370398 A1 Nov. 16, 2023

Related U.S. Application Data

(63) Continuation of application No. 18/081,150, filed on Dec. 14, 2022.

(Continued)

(51) Int. Cl.
*G06F 15/16* (2006.01)
*H04L 51/04* (2022.01)
(Continued)

(52) U.S. Cl.
CPC ............ *H04L 51/04* (2013.01); *G06F 3/0482* (2013.01); *G06F 3/04886* (2013.01); *G06F 40/20* (2020.01)

(58) Field of Classification Search
CPC ... H04L 51/04; G06F 3/0482; G06F 3/04886; G06F 40/20
See application file for complete search history.

(56) References Cited

U.S. PATENT DOCUMENTS

| | | | |
|---|---|---|---|
| 2011/0184962 A1* | 7/2011 | Palmer | G06F 7/00 707/754 |
| 2020/0167699 A1* | 5/2020 | Cohen | H04L 51/52 |
| 2022/0365643 A1* | 11/2022 | Triverio | H04L 65/1093 |

* cited by examiner

*Primary Examiner* — John B Walsh
(74) *Attorney, Agent, or Firm* — Vorys, Sater, Seymour and Pease LLP (57) ABSTRACT

Systems and methods for visual cue based messaging. A visual cue module can provide visual cue data indicative of a visual cue assigned for a contact or a group of contacts from a contact list. A messenger module can output on a display a messenger application GUI. The messenger application GUI includes a message field, a message window with a message thread between a user and the contact or the group of contacts, and a virtual keyboard. The messenger module can output the messenger application GUI with a visual cue graphical element representative of the visual cue to provide a visual indication of the contact or the group of contacts on the display to the user based on the visual cue data. The visual cue can be associated with the messaging field, the message thread, or at least one virtual key of the virtual keyboard.

20 Claims, 8 Drawing Sheets
(4 of 8 Drawing Sheet(s) Filed in Color)

Related U.S. Application Data (60) Provisional application No. 63/366,722, filed on Jun. 21, 2022, provisional application No. 63/364,693, filed on May 13, 2022.

(51) Int. Cl.
*G06F 3/0482* (2013.01)
*G06F 3/04886* (2022.01)
*G06F 40/20* (2020.01)

SYSTEMS AND METHODS FOR VISUAL CUE BASED MESSAGING

RELATED APPLICATION

This application is a continuation application of U.S. Non-Provisional patent application Ser. No. 18/081,150, filed Dec. 14, 2022, which claims priority to U.S. Provisional Patent Application No. 63/364,693, filed May 13, 2022 and U.S. Provisional Patent Application Patent No. 63/366,722, filed Jun. 21, 2022. The entirety contents of each of the above-identified patent applications are incorporated herein by reference.

TECHNICAL FIELD

The present disclosure relates to systems and methods for visual cue based messaging.

BACKGROUND

Text messaging, or texting, is the act of composing and sending electronic messages between two or more users of mobile devices, desktops/laptops, or another type of compatible computer. Text messages may be sent over a cellular network or may also be sent via an Internet connection.

SUMMARY

In an example, a device can include memory to store machine-readable instructions, and one or more processors to access the memory and execute the machine-readable instructions. The machine-readable instructions can include a visual cue module that can be programmed to provide visual cue data indicative of a visual cue assigned for a contact or a group of contacts from a contact list, and a messenger module that can be programmed to output on a display a messenger application graphical user interface (GUI) that includes a compose message field, a message window with a message thread between a user and the contact or the group of contacts, and a virtual keyboard. The messenger application GUI can be programmed to output the messenger application GUI with a visual cue graphical element representative of the visual cue to provide a visual indication of the contact or the group of contacts on the display to the user based on the visual cue data.

In another example, a method can include displaying, at a computing device, a contact list GUI that includes one or more visual cue graphical rendering control elements for a respective contact for controlling whether a visual cue graphical element that is representative of a visual cue is provided as part of a messenger application GUI, manipulating, at the computing device, at least one of the one or more visual cue graphical rendering elements for the respective contact from a first state to a second state to enable generation of the messenger application GUI with the visual cue graphical element representative of the visual cue for the respective contact, and generating, at the computing device, the messenger application GUI with the visual cue graphical element to provide a visual indication of the respective contact on a display to a user in response to manipulating the at least one of the one or more visual cue graphical rendering elements from the first state to the second state.

In a further example, a method can include generating, using a contact list module executing on a computing device, visual cue control generation data to enable a generation of a messenger application GUI with a visual cue graphical element for a contact or group of contacts, generating, using a visual cue module executing on the computing device, visual cue data indicative of a visual cue assigned for the contact or the group of contacts from a contact list in response to receiving the visual cue control display data, and outputting, using a messenger module executing on the computing device, the messenger application GUI that includes a compose message field, a message window with a message thread between a user and the contact or the group of contacts, and a virtual keyboard. The messenger module can be programmed to output the messenger application GUI with the visual cue graphical element representative of the visual cue to provide a visual indication of the contact or the group of contacts on the display to the user based on the visual cue data. The visual cue graphical element for the visual cue can be associated with one of the compose message field, the message window, or at least one virtual key of the virtual keyboard.

Further embodiments, features, and advantages of the invention, as well as the structure and operation of the various embodiments of the invention are described in detail below with reference to accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Text messages are used to enable users to communicate information as messages between user devices. For example, to send a message from a user device to another user device(s), a user initiates a messenger application graphical user interface (GUI) on the user device. In response to initiating the messenger application, the user can identify an existing message thread between the user and one or more other users of the other user devices, or if no message thread exists between the user and the one or more other users, the user can initiate a new message thread for communication with the one or more other users.

In many instances such as when the user has multiple ongoing message threads, the user may unintentionally or inadvertently send a message intended for a given user (e.g., Bob) to a different user (e.g., Sally). The unintended message can confuse a recipient and in some instances result in the recipient responding to the user for more information or clarification, creating an increase in message throughput (e.g., bandwidth at a messaging gateway, such as a short message service (SMS) gateway). In some instances, the user may determine that the message had been sent to the wrong recipient necessitating the user to send a follow-up message to the recipient to notify the recipient that the messages should be ignored, which also increases the message throughput of the messaging gateway.

Moreover, when the user has multiple ongoing message threads with different recipients, the user's memory resources (e.g., working memory) can be overcome and overwhelmed, leading to a cognitive overload. The user can experience cognitive overload when many stimuli demand user attention at the same time. For example, distractions from different sources of information such as different message threads can cause the user to experience cognitive overload, which can lead to the user sending one or more messages to the wrong recipient. The split-attention effect is another type of cognitive overload and occurs when the user has to divide attention between different sources of information, such as different message threads, which can also lead to the user sending a message to an unintended recipient. Thus, the more the user's working memory is overloaded the more likely that the user may send a message to the wrong recipient when the user is communicating with different recipients at about the same time.

Examples are described herein for reducing a frequency that messages are sent to unintended recipients by a user by reducing the cognitive overload of the user. According to the examples herein, visual cues can be presented on a user's device of the user to reduce a likelihood that a message is sent to an unintended recipient. In the examples herein, a messenger application GUI can be provided with visual cues that reduce the likelihood that the user sends the message to the wrong recipient, and improves a user's messaging experience by alerting a user when a message should not be sent to a selected message recipient. Moreover, because the likelihood that the user sends the message to the unintended recipient is reduced according to the examples herein can improve a message throughput at a messaging gateway as neither the user nor the unintended recipient would need to send follow messages through the messaging gateway.

Figure 1:
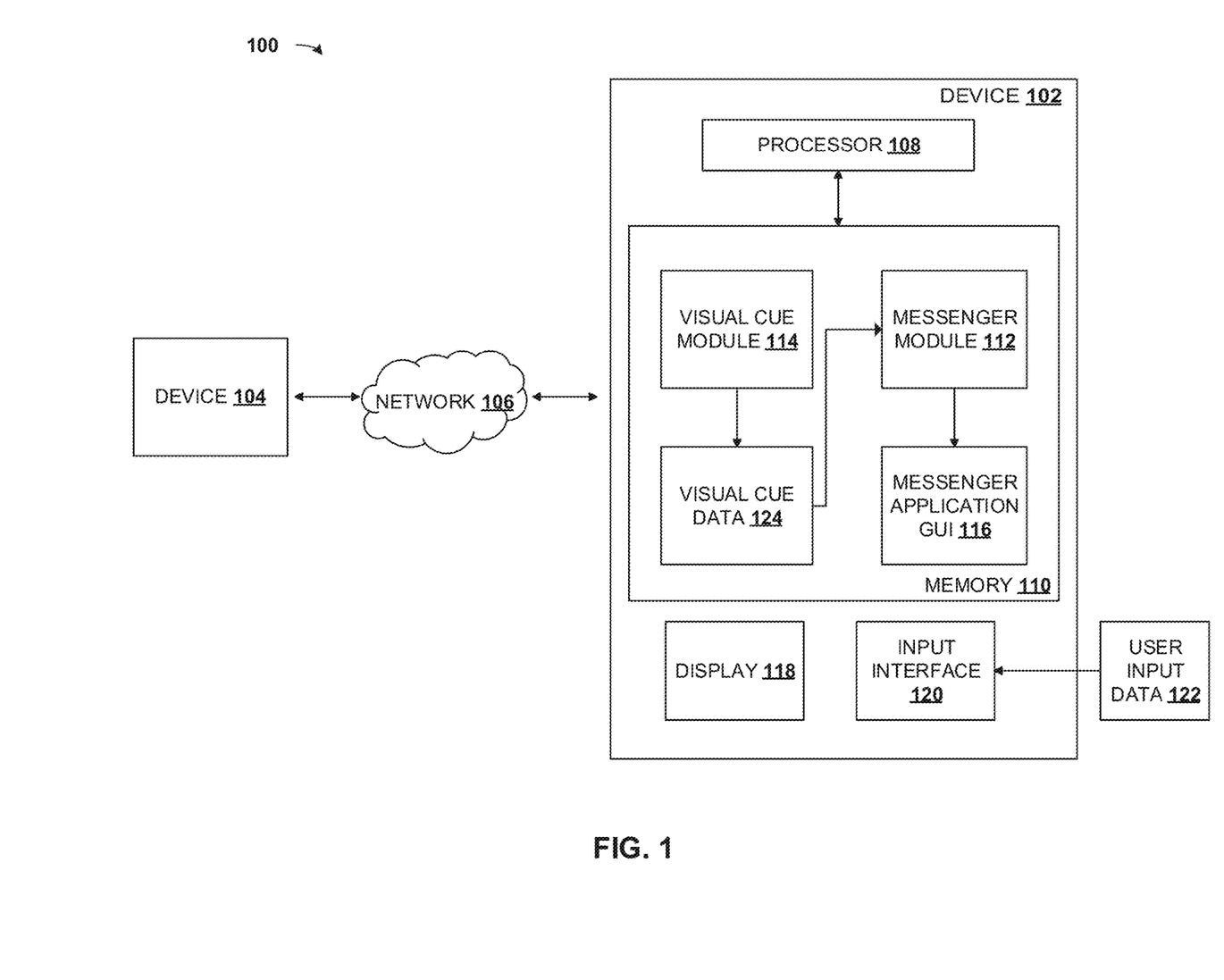
FIG. 1 is an example of a messaging system.

FIG. 1 is an example of a messaging system 100. The messaging system 100 can include multiple devices, for simplicity and brevity purposes, the messaging system 100 includes a first device 102 and a second device 104. The first and second devices 102 and 104 may be configured to exchange information as messages over a network 106. The network 106 can include one or more wired and/or wireless networks, including, but not limited to: a cellular network, a wide area network ("WAN"), a local area network ("LAN"), a combination thereof, and/or the like. One or more wireless technologies that can be included within the network 106 can include, but are not limited to: wireless fidelity ("Wi-Fi"), a WiMAX network, a wireless LAN ("WLAN") network, BLUETOOTH® technology, a combination thereof, and/or the like. For instance, the network 106 can include the Internet and/or the Internet of Things ("IoT"). In various examples, the network 106 can include one or more transmission lines (e.g., copper, optical, or wireless transmission lines), routers, gateway computers, and/or servers. Further, the first and second devices 102 and 104 can include one or more network adapters and/or interfaces (not shown) to facilitate communications via the network 106.

For example, the network 106 in some instances can include the cellphone network that can support or use a standardized communication protocol to support the exchange of messages between the first and second devices 102 and 104. In an example, wherein the network 106 is a cellphone network, the network 106 includes a messaging gateway, such as an SMS gateway. The first and second devices 102 and 104 may be any computing device, such as a portable device, a computer, or a stationary device. For example, if the first and second devices 102 and 104 are mobile devices (e.g., cellphones, tablets, and/or the like) that support SMS messages, and the network 106 supports SMS, the first and second devices 102 and 104 can be configured to exchange the information using SMS messages.

The first device 102 includes one or more processors 108 and memory 110. For clarity and brevity purposes other functions and features of the first device 102 have been omitted (e.g., a peripheral interface, audio circuitry, proximity sensors, RF circuitry, display controller, optical sensors, touch-sensitive display system, etc.). By way of example, the memory 110 can be implemented, for example, as a non-transitory computer storage medium, such as volatile memory (e.g., random access memory), non-volatile memory (e.g., a hard disk drive, a solid-state drive, a flash memory, or the like) or a combination thereof. The one or more processors 108 could be implemented, for example, as one or more processor cores. The memory 110 can store machine-readable instructions that can be retrieved and executed by the one or more processors 108. The memory 110 can include a messenger module 112 and a visual cue module 114. While examples are described herein with respect to the first device 102 including the messenger module 112 and the visual cue module 114, in other or additional examples the second device 104 can be implemented in a same or similar manner as the first device 102.

The messenger module 112 can be executed by the one or more processors 108 to output a messenger application graphical user interface GUI 116 on a display 118 of the first device 102. The messenger application GUI 116 may be an SMS application, an instant messaging application, or another type of messaging application (e.g., e-mail, chat application, etc.). The messenger application GUI 116 can be modified (e.g., generated, updated, etc.) by the messenger module 112 to support visual cue graphical elements representative of visual cues, as described herein. The term "graphical element" as used herein with respect to visual cues can include static or dynamic graphical features that can be implemented as part of a GUI. Thus, in some examples, the visual cue graphical elements may correspond to or be implemented as part of windows, menus, tabs, borders, symbols, objects, graphics, texts, or icons). The messenger application GUI 116 can include a message window for displaying messaging threads that include messages that have been sent or received between the first device 102 and the second device 104, or other devices (not shown in FIG. 1). The messenger application GUI 116 can further include a compose message field wherein a first user of the first device 102 can provide information that is to be provided as a message to a second user of the second device 104. The messages that have been sent or received between the first and second devices 102 and 104 can be visualized in the corresponding message thread in the message window.

In some examples, the messenger application GUI 116 can include a virtual keyboard for composing the information that is to be communicated as one or more messages to the second device 104. The composed information can include alphabetic and numeric characters, digital images, videos, sound content, ideograms (e.g., emoji, such as happy faces, sad faces, and other icons), and/or any type of content that can be sent as a message. The messenger application GUI 116 can communicate with a contact list module (not shown in FIG. 1) to receive a contact list or access the contact list in the memory 110. The second user of the second device 104 can correspond to a contact in the contact list and can be identified using an associated pseudonym (e.g., a screen name, such as "Wife"), or an original or true name (e.g., first and/or last name, such as "Suzy Roberts").

The first device 102 can also include an input interface 120, such as a keyboard. In some examples, the input interface 120 corresponds to the virtual keyboard of the messenger application GUI 116. The visual cue module 114 can communicate with the messenger module 112 for embedding or creating visual cue graphical elements in the messenger application GUI 116 for one or more contacts from the contact list. For example, the visual cue module 114 can provide a unique visual cue graphical element for the one or more contacts identified in the messenger application GUI 116. The visual cue module 114 can receive user input data 122 indicative of a type of visual cue assignment and output corresponding visual cue data 124. The type of visual cue assignment can include a background color assignment, a keyboard color assignment, an image background assignment, a message field assignment (e.g., a color or an image field assignment), and/or a highlight assignment (e.g., a message field highlight assignment or message window assignment).

In some examples, the visual cue module 114 can receive user input data 122 that is indicative of a color type for a respective contact or a group of contacts from the contact list. The visual cue module 114 can assign a corresponding color (e.g., from a color wheel, or a set of individual colors) to the respective contact or group of contacts to function as a visual cue for the contact or the group of contacts. For example, a color pink can be assigned to Sally and a color red can be assigned to Bob. The visual cue module 114 can communicate to the messenger module 112 visual cue data 124 that is indicative of the assigned color for a corresponding contact or group of contacts from the contact list.

The messenger module 112 can output the messenger application GUI 116 with the assigned color for the respective contact or the group of contacts based on the visual cue data 124. For example, the messenger application GUI 116 can include a message window with a message thread between the first user of the first device 102 and the second user of the second device 104 having a different background color than a message thread between the first user of the first device 102 and a third user of a third device (not shown in FIG. 1). In other examples, the messenger module 112 can output the messenger application GUI 116 with a border for the message thread with a unique color, such as a single color (e.g., Blue), a set of colors, or a dynamic color (e.g., changing colors, a color spectrum, etc.). Thus, in some instances, a border or background for different message threads can have a unique color to provide a visual cue or indication to the first user of the first device 102 of the corresponding recipient or the group of recipients.

In some examples, the messenger module 112 can output the messenger application GUI 116 with at least one key of the virtual keyboard having a unique color for the corresponding recipient or the group of recipients associated with the message thread based on the visual cue data 124. For example, the messenger module 112 can output the messenger application GUI 116 with the at least one key of the virtual keyboard having the color pink if the message thread associated with Sally is currently being displayed on the display 118 rather than Bob.

In some examples, the messenger module 112 can output the messenger application GUI 116 with the compose message field having a unique color for the message thread between the first user of the first device 102 and the second user of the second device 104 based on the visual cue data 124. In other examples, the messenger module 112 can output the messenger application GUI 116 with a border of the compose message field having a unique color, such as a single color, a set of colors, or a dynamic color. Thus, in some examples, the compose message field associated with a respective message thread can have a unique color to provide a visual cue or indication to the first user of the first device 102 of the corresponding recipient or the group of recipients.

In some examples, the user input data 122 can include an image (e.g., hearts) or specify an image from a set of images in the memory 110 for the respective contact or the group of contacts from the contact list. The visual cue module 114 can assign the image to the respective contact or the group of contacts and provide the visual cue data 124 with the image associated with the respective contact or the group of contacts as or part of the visual cue data 124. The messenger module 112 can output the messenger application GUI 116 with the associated image for the respective contact or the group of contacts based on the visual cue data 124. Thus, in some examples, the message threads can have backgrounds with different images to provide a visual cue to the first user of the first device 102 of the corresponding recipient or group of recipients.

In other examples, the messenger module 112 can output the messenger application GUI 116 with the associated image in the message field for a period of time or until the first user inputs information into the message field. Thus, in some instances, a text field associated can have a unique image for a respective message thread to provide a visual cue or indication to the first user of the first device 102 of the corresponding recipient or the group of recipients. In further examples, if a contact is part of a message thread on the first device 102 that includes multiple recipients (e.g., a group message), and the contact was the last contact to respond in a message hierarchy or chain, the messenger module 112 can output the messenger application GUI 116 with the contact having a corresponding visual cue assignment.

In some examples, the input interface 120 can receive user input data 122 indicative of information that is to be provided to a recipient (e.g., the second user) as one or more messages. The information can be provided to the compose message field for an existing or a new message thread. The compose message field may include or be associated (e.g., logically within the memory 110) with a send message element for controlling communication of the information as one or more messages to a recipient. In response to initiating the send message element, the messenger application GUI 116 can display a confirmation graphical element to confirm whether a user intends to send the one or more messages to the recipient. For example, the confirmation graphical element is provided as part of the messenger application GUI 116 in response to the user interacting (e.g., confirming) with the send message element.

Accordingly, the examples herein provide a technique that reduces a frequency that messages are sent to unintended recipients by the first user of the first device 102 by reducing the cognitive overload of the first user. Visual cues identified by the visual cue data 124 can be presented on the first device 102 of the first user to reduce a likelihood that a message is sent to an unintended recipient such as the third user rather than the second user of the second device 104. Because the messenger module 112 can provide the messenger application GUI 116 with visual cues this can reduce a likelihood that the first user experiences a cognitive overload, which increases a likelihood that the user sends the message to an intended recipient, such as the second user of the second device 104. Moreover, because the likelihood that the first user sends the message to the unintended recipient is reduced (e.g., the third user) can improve a message throughput at a messaging gateway (e.g., located on the network 106, as shown in FIG. 1) as neither the first user nor the unintended recipient would need to send follow messages.

Figure 2:
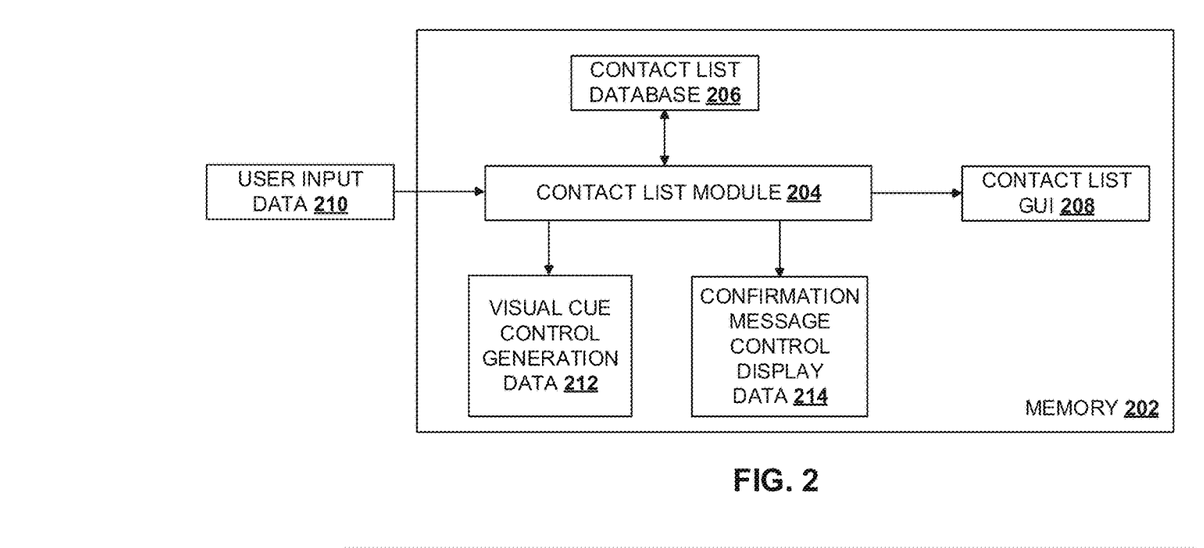
FIG. 2 is an example of a contact list module.

FIG. 2 is an example of memory 202 with a contact list module 204. In some instances, the memory 202 is or forms a part of the memory 110, as shown in FIG. 1. Thus, reference can be made to the example of FIG. 1 in the example of FIG. 2. In some examples, the messenger application GUI 116 can communicate with the contact list module 204 to receive a contact list or access the contact list in the memory 202. The contact list module 204 can be programmed to query or search a contact list database 206 stored within the memory 202. The contact list database 206 can store a plurality of contacts. The contact list module 204 can be programmed to output a contact list GUI 208 with the plurality of contacts. The contact list module 204 can receive user input data 210 indicative of one or more contacts or group of contacts for visual cue assignment, referred to as a selected contact. The user input data 210 can be provided via the input interface 120, as shown in FIG. 1.

By way of further example, the contact list GUI 208 can include one or more visual cue graphical rendering control elements that can control whether a respective visual cue graphical element is provided as part of the messenger application GUI for the selected contact. At least one of the one or more visual cue graphical rendering control elements can be changed from a first state to a second state based on user input data 210 to enable generation of the messenger application GUI 116 with the respective visual cue graphical element representative of the visual cue for the selected contact. The contact list module 204 can be programmed to provide visual cue control generation data 212 that enables the generation of the messenger application GUI 116 with the respective visual cue graphical element for the visual cue in response to the at least one of the one or more visual cue graphical rendering control elements changing from the first state to the second state. The visual cue module 114 can be programmed to generate the visual cue data 124 in response to the receiving the visual cue control generation data 212.

In some examples, the contact list GUI 208 includes a send confirmation graphical element for controlling whether a confirmation graphical element is provided as part of the messenger application GUI 116. The confirmation graphical element can be used to confirm whether a user intends to send information within the compose message field to the selected contact. The contact list module 204 can be programmed to provide confirmation message control display data 214 that enables generation of the messenger application GUI 116 with the confirmation graphical element. The messenger module 112 can be programmed to provide the messenger application GUI 116 with the confirmation graphical element in response to the receiving the confirmation message control display data 214. In some examples, the messenger module 112 can include a repository or a database of graphical elements, which can include the confirmation graphical element, the visual cue graphical element, and/or other graphical elements that can be provided for the generation of the messenger application GUI 116.

Figure 3:
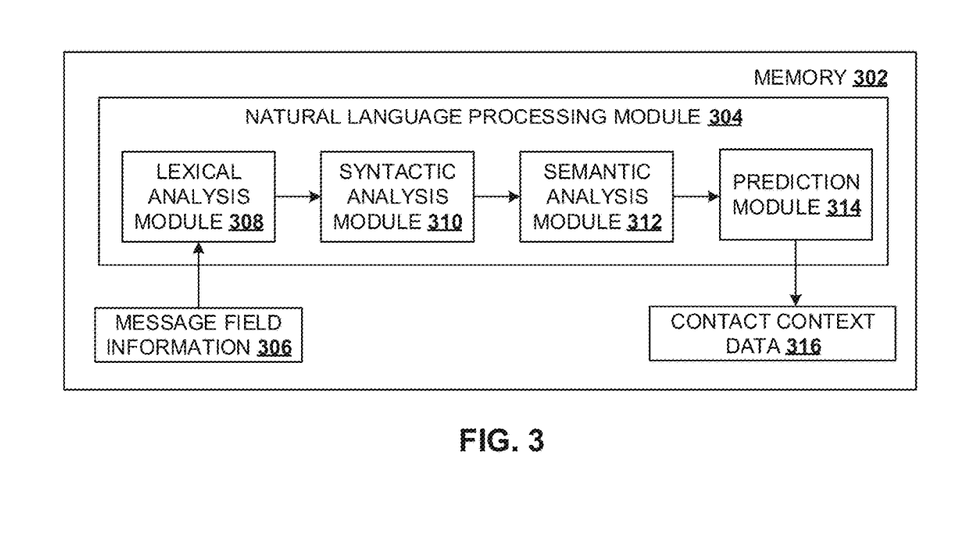
FIG. 3 is an example of a natural language processing (NLP) module.

FIG. 3 is an example of memory 302 with a natural language processing (NLP) module 304. In some instances, the memory 302 is or forms a part of the memory 110, as shown in FIG. 1. Thus, reference can be made to the example of FIG. 1 in the example of FIG. 3. The NLP module 304 can be programmed to receive message field information 306. In some examples, the NLP module 304 can be programmed to receive information for a given period of time of a related message thread for a corresponding contact in addition to or as an alternative to the message field information 306. For example, the message field information 306 can correspond to information indicative of text inputted based on the user input data 122 as part of the compose message field of the messenger application GUI 116. The NLP module 304 can include a lexical analysis module 308 that can be programmed to split the text into words or small units corresponding to tokens to identify meanings and a relationship to an entire sentence.

The NLP module 304 can further include a syntactic analysis module 310 that can be programmed to identify relationships between different words and phrases within a sentence. The syntactic analysis module 310 can be programmed to standardize said words and phrases, and express said relationships in a hierarchical structure. The NLP module 304 can further include a semantic analysis module 312 that can be programmed to relate syntactic structure, from levels of phrase, clauses, sentences, and paragraphs to a level of writing as a whole, to respective language-independent meanings.

In some examples, the NLP module 304 can include a prediction module 314 that can determine (e.g., predict) whether the information within the compose message field is intended for a correct contact or group of contacts. While the example of FIG. 3 illustrates the prediction module 314 as part of the NLP module 304 in other examples the prediction module 314 can be implemented as a stand-alone module or component. The prediction module 314 can provide contact context data 316 indicating that the information within the compose message field is not intended for the contact or the group of contacts. The prediction module 314 can be implemented as a trained machine learning (ML) model that can process the output of the NLP module 304 to provide a recommendation or prediction of whether the information within the compose message field is intended for the correct contact or the group of contacts. As an example, the ML model can be a deep learning model (e.g., a convolution neural network (CNN)), but in other examples, a different ML model can be used.

The prediction module 314 can be programmed to track a user's behavior with respect to contacts in the contact list (e.g., information sent and received from one or more contacts) and learn whether the information should or should not be sent to a particular contact or group of contacts. For example, if the prediction module 314 is implemented on a mobile phone, the prediction module 314 can learn the behaviors of the user to help ensure each text message is sent to the correct user. For example, a user "Albert" is engaged in a succession of text messages with "Bob". After exchanging a number of message (e.g., four (4) messages), Albert receives a new message from "Cary". Albert types the response to Cary but wants to get back to Bob. Albert composes a message. But Albert's brain is used to seeing Bob as the last text and so Albert replies to Cary because Cary is now at the top of the list. The prediction module 314 can be programmed to learn the user's pattern and know that Albert is really intending to send a message to Bob, not Cary. When Albert clicks the "send message" graphical element of the messenger application GUI 116, Albert will be prompted with a message asking to confirm that a message should be sent to Cary according to the examples herein. Knowing this is a mistake, the prediction module 314 or the messenger module 112 can be programmed to allow Albert to change the recipient, and not have to delete the entire message. Alternatively, Albert can override the message and send it to Cary.

Figure 4:
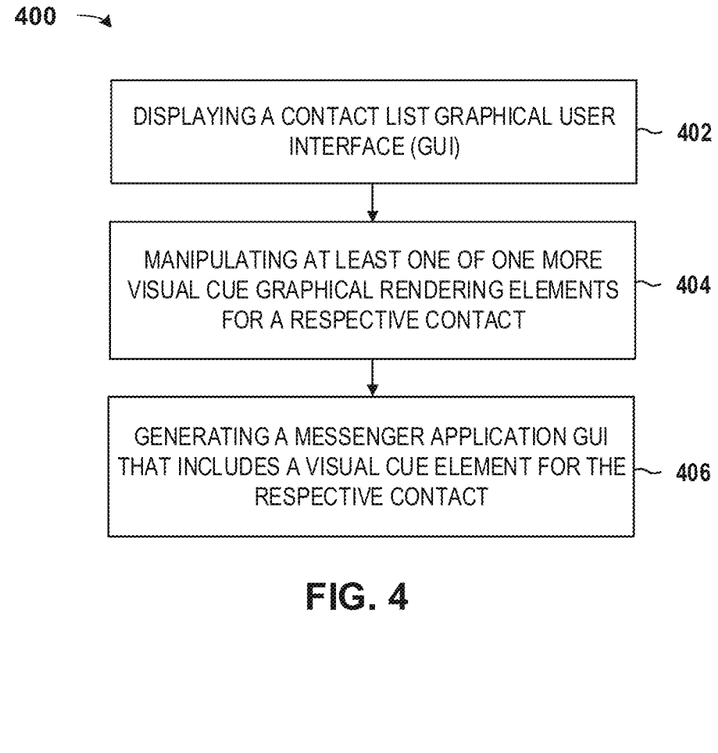
FIG. 4 is an example of a method for generating a visual cue for a contact.
Figure 5:
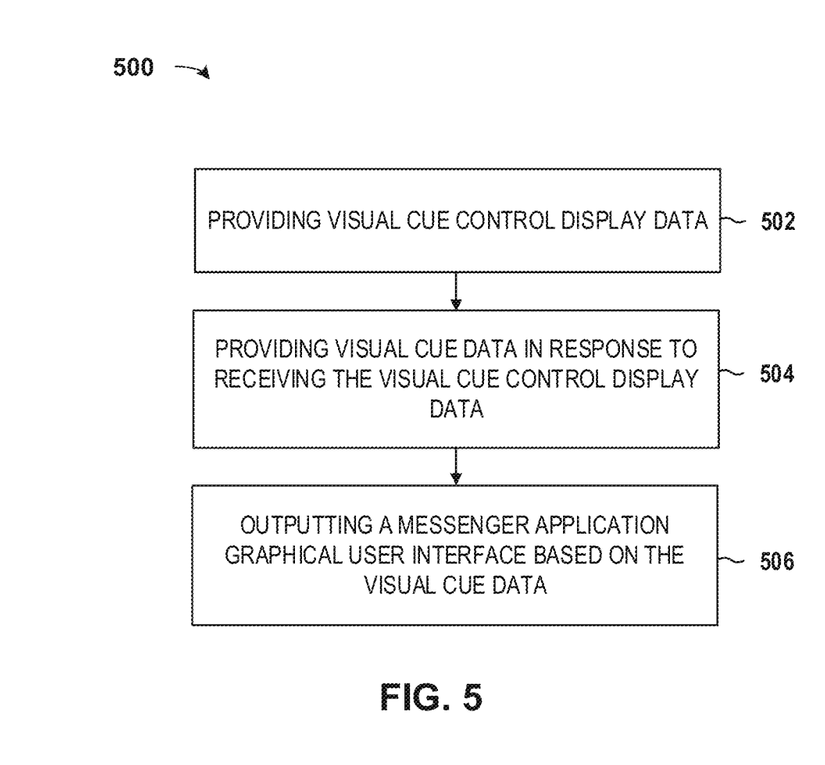
FIG. 5 is an example of another method for generating a visual cue for a contact.

In view of the foregoing structural and functional features described above, example methods will be better appreciated with reference to FIGS. 4-5. While, for purposes of simplicity of explanation, the example methods of FIGS. 4-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 4 is an example of a method 400 for generating a visual cue for a contact or a group of contact in a contact list. The method 400 can be implemented by a computing device, such as the first device 102, as shown in FIG. 1. Thus, reference can be made to the example of FIGS. 2-3 in the example of FIG. 4. The method 400 can begin at 402 by displaying, at a computing device, a contact list GUI (e.g., the contact list GUI 208, as shown in FIG. 1). The contact list GUI can include one or more visual cue graphical rendering control elements for a respective contact for controlling whether a visual cue graphical element representative of a visual cue is provided as part of a messenger application GUI (e.g., the messenger application GUI 116, as shown in FIG. 1). At 404, manipulating, at the computing device, at least one of the one or more visual cue graphical rendering elements for the respective contact from a first state to a second state to enable generation of the messenger application GUI with the visual cue graphical element representative of the visual cue for the respective contact. At 406 generating, at the computing device, the messenger application GUI with the visual cue graphical element to provide a visual indication of the respective contact on a display to a user in response to manipulating the at least one of the one or more visual cue graphical rendering elements from the first state to the second state.

FIG. 5 is an example of another method 500 for generating a visual cue for a contact or a group of contact in a contact list. The method 500 can be implemented by a computing device, such as the first device 102, as shown in FIG. 1. Thus, reference can be made to the example of FIGS. 2-3 in the example of FIG. 5. The method 500 can begin at 502 by providing (e.g., via the contact list module 204, as shown in FIG. 2) visual cue control generation data (e.g., the visual cue control generation data 212, as shown in FIG. 2) to enable generation of a messenger application GUI (e.g., the messenger application GUI 116, as shown in FIG. 1) with a visual cue graphical element for a contact or group of contacts. At 504, providing (e.g., via the visual cue module 114, as shown in FIG. 1) visual cue data (e.g., the visual cue data 124, as shown in FIG. 1) indicative of a visual cue assigned for the contact or the group of contacts from a contact list (e.g., in some instances stored in the contact list database 206, as shown in FIG. 2) in response to receiving the visual cue control display data.

At 506, outputting (e.g., via the messenger module 112, as shown in FIG. 1) the messenger application GUI that includes a compose message field, a message window with a message thread between a user and the contact or the group of contacts, and a virtual keyboard based on the visual cue data. The messenger application GUI further includes the visual cue graphical element that is representative of the visual cue to provide a visual indication of the contact or the group of contacts on the display to the user. The visual cue graphical element for the visual cue can be associated with one of the compose message field, the message window, or at least one virtual key of the virtual keyboard of the messenger application GUI.

Figure 6:
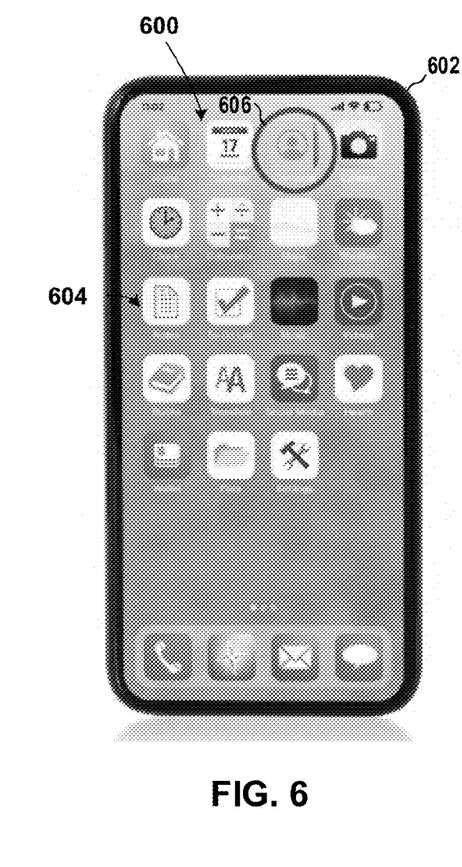
FIGS. 6-15 are examples of graphical user interfaces (GUIs) rendered on a device for configuring and using the device for visual cue based messaging.
Figure 7:
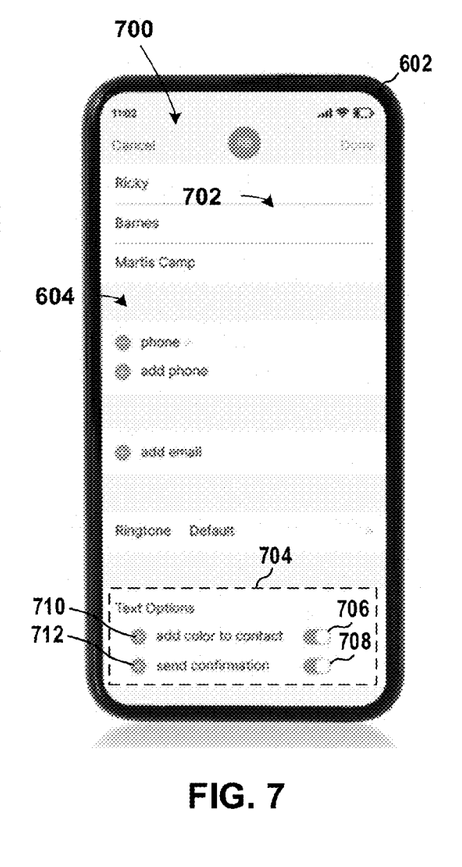
Figure 8:
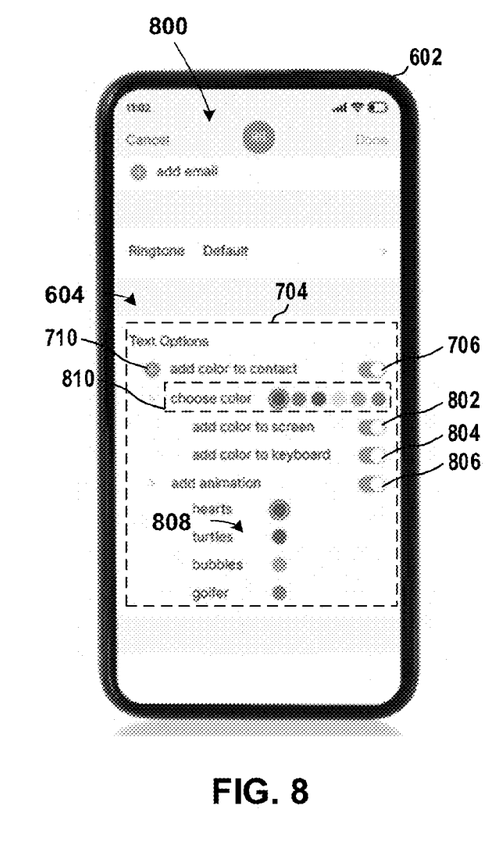

FIGS. 6-8 are example of GUIs 600-800 that can be rendered on a device 602 according to the examples described herein. The device 602 can correspond to the first device 102, as shown in FIG. 1. Thus, reference can be made to the example of FIGS. 1-2 in the example of FIGS. 6-8. The GUI 600 can be rendered on a display 604 of the device 602. In some examples, the GUI 600 be referred to as a home-screen GUI. A contact graphical element 606 can be activated (e.g., touched, if the device 602 has touch screen functionality, or through an input interface) by a user and navigated to open the GUI 700 on the display 604 of the device 602, as shown in FIG. 7. The GUI 700 can be rendered by the contact list module 204, as shown in FIG. 2. The GUI 700 includes a contact identification field 702 for a contact (in the example of FIG. 7, the contact is "Ricky Barnes").

The GUI 700 further includes a text option graphical element 704 that includes a visual cue graphical rendering control element 706 and a send confirmation graphical element 708. The visual cue graphical rendering control element 706 can be changed from a first state to a second state to enable the generation of the messenger application GUI 116 with a visual cue element representative of a visual cue for the contact having a particular color. The send confirmation graphical element 708 can be changed from a first state to a second state to enable a confirmation graphical element to be provided as part of the messenger application GUI 116 to confirm whether the user intends to send information within the compose message field to the contact.

The text option graphical element 704 can further include an expander graphical elements 710 and/or 712 for each of the elements 706 and 708. For example, the expander graphical element 710 can be activated to de-collapse visual content, as shown at the GUI 800 of FIG. 8. The de-collapsed visual content includes visual cue graphical rendering control element 802 that is indicative of an option to add color to a screen (e.g., the message field), a visual cue graphical rendering control element 804 that is indicative of an option to add color to a keyboard (e.g., the virtual keyboard), and a visual cue graphical rendering control element 806 that is indicative of an option to add animation (e.g., in some instances to a background of the message field, or to the compose message field). Each of the visual cue graphical rendering control elements 802-806 can be changed from a first state to a second state to enable the generation of the messenger application GUI 116 with a visual cue element representative of a corresponding visual cue type. In some examples, in response to changing the visual cue graphical rendering control element 806 from the first state to the second state, a corresponding animation (e.g., image) from a set of animations 808 can be selected for the visual cue for the contact. In further examples, in response to activating the expander graphical element 710, a color selection 810 can be provided to enable the user to select a corresponding color (e.g., pink, as shown in FIG. 8) for the visual cue graphical element for the contact.

Figure 9:
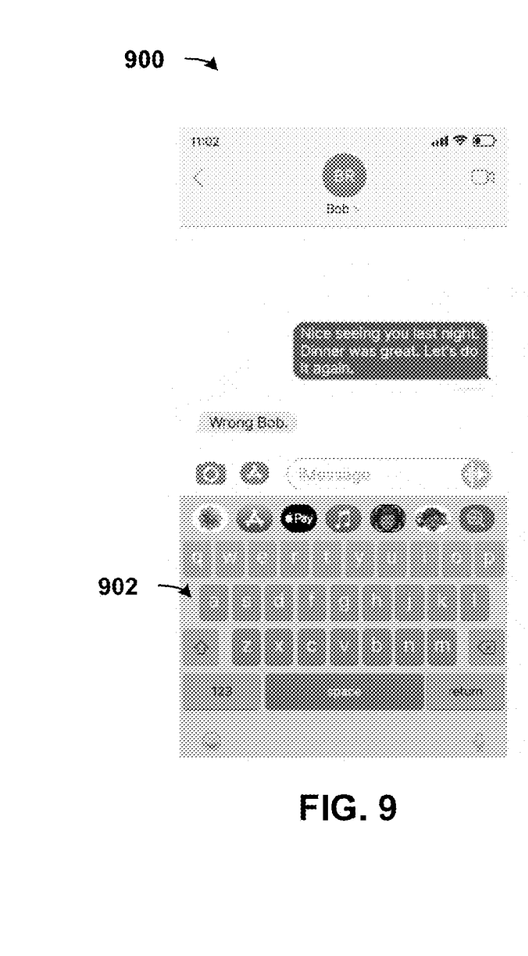
Figure 10:
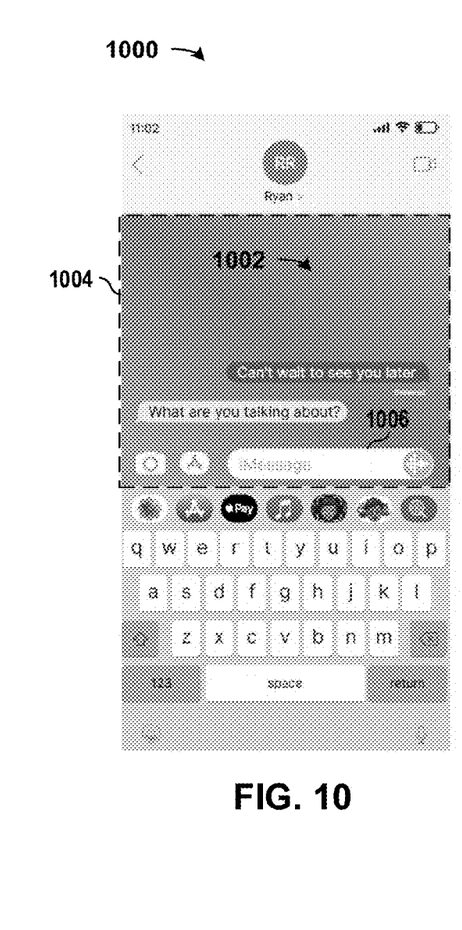
Figure 11:
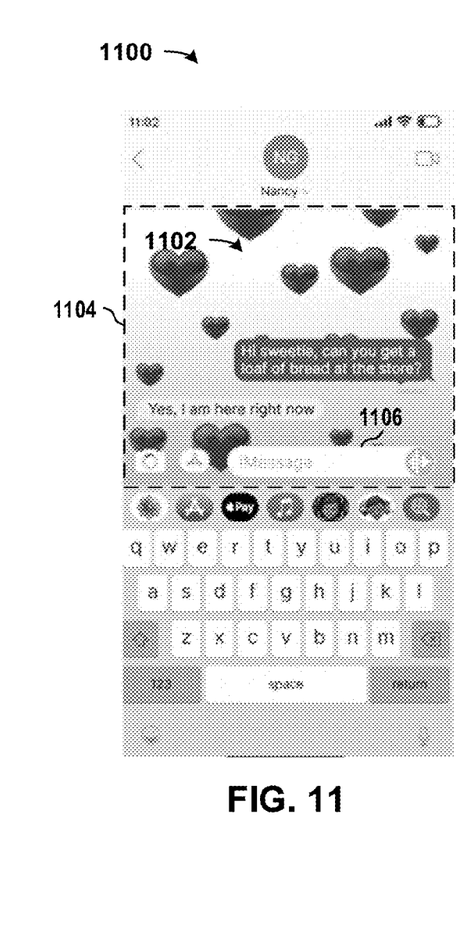

FIGS. 9-11 are examples of messenger application GUIs 900-1100 that can be rendered on a device, such as the first device 102, as shown in FIG. 1, or the device 602, as shown in FIGS. 6-8 according to the examples described herein. Thus, reference can be made to the example of FIGS. 1 and 6-8 in the example of FIGS. 9-11. The messenger module 112 can be programmed to provide the messenger application GUI 900 as shown in FIG. 9 based on the visual cue data 124. In the GUI 900, a virtual keyboard 902 is assigned a color to provide a visual cue for a particular contact. In the example of FIG. 9, it is assumed that the user has two contacts with similar names (e.g., "Bob") in a contact list.

In some examples, the messenger module 112 can be programmed to provide the messenger application GUI 1000 as shown in FIG. 10 based on the visual cue data 124. A background 1002 of a message window 1004 of the messenger application GUI 1000 is assigned a unique color or composite of colors for the contact identified therein as "Ryan". In some examples, the messenger module 112 can be programmed to provide a messenger application GUI 1100 as shown in FIG. 11 based on the visual cue data 124. A background 1102 of a message window 1104 of the messenger application GUI 1100 is assigned a unique animation or image for the contact identified therein as "Nancy". While the example of FIGS. 10-11 includes a respective compose message field 1006 and 1106, in other examples, the respective compose message fields 1006 and 1106 can be graphically positioned outside a corresponding message window 1004 and 1104.

Figure 12:
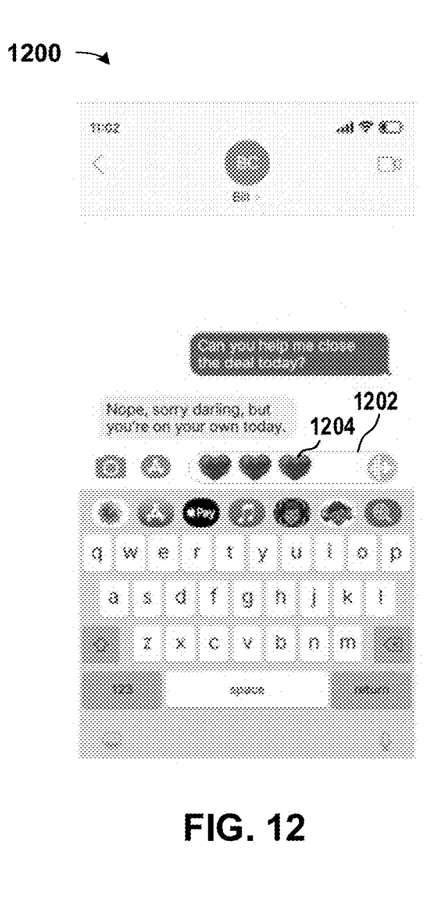

FIGS. 12-15 are examples of messenger application GUIs 1200-1500 that can be rendered on a device, such as the first device 102, as shown in FIG. 1, or the device 602, as shown in FIGS. 6-8 according to the examples described herein. Thus, reference can be made to the example of FIGS. 1 and 6-8 in the example of FIGS. 12-15. The messenger module 112 can be programmed to provide the messenger application GUI 1200 as shown in FIG. 12 based on the visual cue data 124. A compose message field 1202 of the messenger application GUI 1200 is generated (e.g., populated) with a unique animation or image 1204 for a contact (referred to as "Bill" in the example of FIG. 12), for example, in response to the user navigating to the messenger application GUI 1200.

Figure 13:
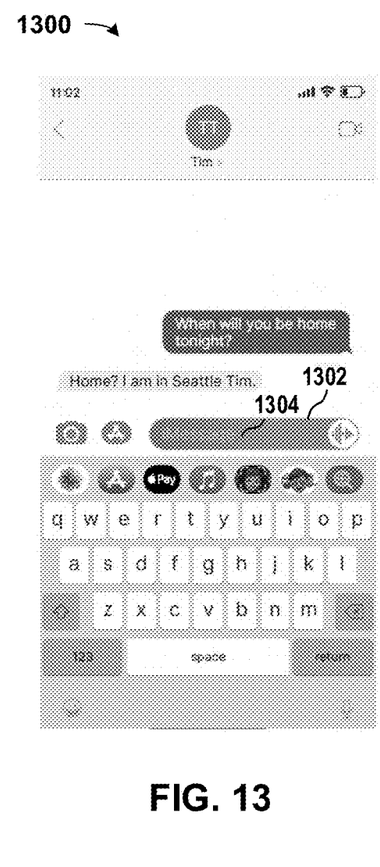
Figure 14:
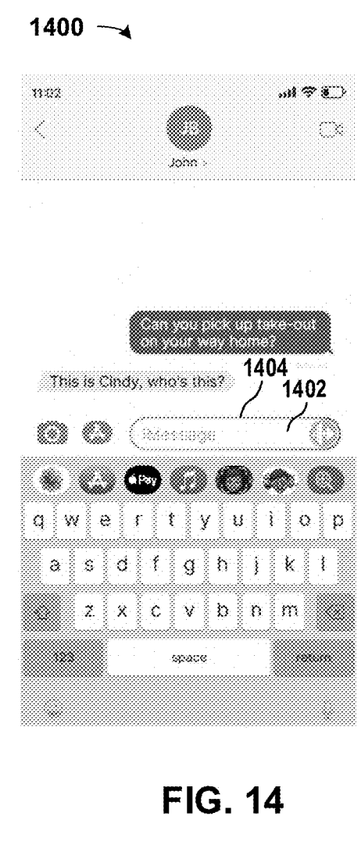
Figure 15:
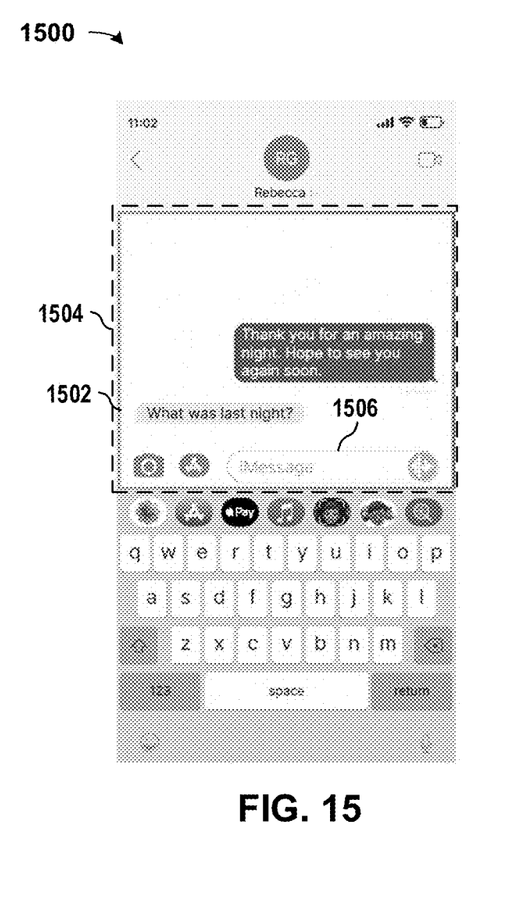

In some examples, the messenger module 112 can be programmed to provide the messenger application GUI 1300 as shown in FIG. 13 based on the visual cue data 124. A compose message field 1302 of the messenger application GUI 1300 is generated (e.g., populated) with a unique color or set of colors 1302 for a contact (referred to as "Tim" in the example of FIG. 13), for example, in response to the user navigating to the messenger application GUI 1300. In some examples, the messenger module 112 can be programmed to provide a messenger application GUI 1400 as shown in FIG. 14 based on the visual cue data 124. A compose message field 1402 of the messenger application GUI 1400 is generated (e.g., populated) with a border 1404 having a unique color or set of colors for a contact (referred to as "John" in the example of FIG. 14), for example, in response to the user navigating to the messenger application GUI 1400. By way of further example, the messenger module 112 can be programmed to provide a messenger application GUI 1500 as shown in FIG. 15 based on the visual cue data 124. A border 1502 of a message window 1504 of the messenger application GUI 1500 is generated with a unique color or a set of colors for the contact identified therein as "Rebecca". While the example of FIG. 15 includes a compose message field 1506, in other examples, the compose message field 1506 can be graphically positioned outside the message window 1504.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on."

What is claimed is:

1. A device comprising:
   memory to store machine-readable instructions;
   one or more processors to access the memory and execute the machine-readable instructions, the machine-readable instructions comprising:
   a visual cue module programmed to provide visual cue data indicative of a visual cue assigned for a contact or a group of contacts from a contact list;
   a messenger module programmed to output on a display a messenger application graphical user interface (GUI) that includes a compose message field, a message window with a message thread between a user and the contact or the group of contacts, and a virtual keyboard, wherein the messenger module is programmed to output the messenger application GUI with a visual cue graphical element representative of the visual cue to provide a visual indication of the contact or the group of contacts on the display to the user based on the visual cue data; and
   a contact list module that is programmed to output one or more visual cue graphical rendering control elements to enable the visual cue graphical element to be provided as part of the messenger application GUI.

2. The device of claim 1, wherein the visual cue graphical element is associated with one of the compose message field, the message window, or at least one virtual key of the virtual keyboard.

3. The device of claim 2, wherein the visual cue module is further programmed to:
   receive user input data at an input interface for each contact or group of contacts identifying a type of visual cue for assignment to the contact or the group of contacts; and
   assign the visual cue to the contact or the group of contacts based on the user input data.

4. The device of claim 3, wherein the visual cue module is further programmed to store the visual cue assigned to the contact or the group of contacts in the memory.

5. The device of claim 4, wherein the machine-readable instructions further include a contact list database that stores a plurality of contacts that includes the contact or the group of contacts.

6. The device of claim 5, wherein the contact list module is further programmed to receive user input data indicative of a selected contact from the plurality of contacts corresponding to the contact or the group of contacts.

7. The device of claim 6, wherein at least one of the one or more visual cue graphical rendering control elements is changed from a first state to a second state to enable generation of the messenger application GUI with the visual cue graphical element representative of the visual cue on the display.

8. The device of claim 7, wherein the contact list module is programmed to provide visual cue control generation data that enables generation of the messenger application GUI with the visual cue graphical element for the visual cue in response to changing the at least one of the one or more visual cue graphical rendering control elements from the first state to the second state, the visual cue data being generated in response to the visual cue module receiving the visual cue control generation data.

9. The device of claim 8, wherein the contact list GUI includes a send confirmation graphical element for controlling whether a confirmation graphical element is provided as part of the messenger application GUI to confirm whether the user intends to send information within the compose message field to the contact or the group of contacts, and
    the contact list module is further programmed to provide confirmation message control display data that enables generation of the messenger application GUI with the confirmation graphical element.

10. The device of claim 9, wherein the messenger application GUI includes a send message element associated with the compose message field for sending the information within the compose message field to the contact or the group of contacts as one or more messages, and the confirmation graphical element is provided as part of the messenger application GUI in response to the user interacting with the send message element.

11. The device of claim 10, wherein the information within the compose message field is sent as the one or more messages to the contact or the group of contacts in response to the user confirming via the confirmation graphical element that the user intends to send the information to the contact or the group of contacts.

12. The device of claim 11, wherein the machine-readable instructions further include a machine learning model programmed to process the information within the compose message field to determine whether the information within the compose message field is intended for a correct contact or group of contacts.

13. The device of claim 12, wherein the machine learning model is further programmed to provide contact context data indicating that the information within the compose message field is not intended for the contact or the group of contacts.

14. The device of claim 13, wherein the messenger module is programmed to provide the messenger application GUI with a non-intended contact graphical element on the display to alert the user that the information within the compose message field is not intended for the contact or the group of contacts.

15. A method comprising:
    displaying, at a computing device, a contact list graphical user interface (GUI) that includes one or more visual cue graphical rendering control elements for a respective contact for controlling whether a visual cue graphical element representative of a visual cue is provided as part of a messenger application GUI for the respective contact;
    manipulating, at the computing device, at least one of the one or more visual cue graphical rendering elements for the respective contact from a first state to a second state to enable generation of the messenger application GUI with the visual cue graphical element representative of the visual cue for the respective contact; and
    generating, at the computing device, the messenger application GUI with the visual cue graphical element to provide a visual indication of the respective contact on a display to a user in response to manipulating the at least one of the one or more visual cue graphical rendering elements from the first state to the second state.

16. The method of claim 15, further comprising processing, at the computing device, information within a compose message field of the GUI through a natural language processing (NLP) model stored within a memory of the computing device to determine whether the information within the compose message field is intended for the respective contact.

17. The method of claim 16, further comprising generating, at the computing device, the messenger application GUI with a non-intended contact graphical element on the display to alert the user that the information within the compose message field is not intended for the contact or the group of contacts in response to the NLP model determining that the information within the compose message field is not intended for the respective contact.

18. A method comprising:
    rendering, using a contact list module executing on a computing device including at least one processor, one or more visual cue graphical rendering control elements for controlling whether a visual cue graphical element representative of a visual cue for a contact or a group of contacts is provided as part of a messenger application graphical user interface (GUI);
    generating, using the contact list module executing on the computing device, visual cue control generation data in response to user input to enable the visual cue graphical element to be provided as part of the messenger application GUI;
    generating, using a visual cue module executing on the computing device, visual cue data indicative of a visual cue assigned for the contact or the group of contacts from a contact list based on the visual cue control display data; and
    outputting, using a messenger module executing on the computing device, the messenger application GUI that includes a compose message field, a message window with a message thread between a user and the contact or the group of contacts, and a virtual keyboard,
    wherein the messenger module is programmed to output the messenger application GUI with the visual cue graphical element representative of the visual cue to provide a visual indication of the contact or the group of contacts on the display to the user based on the visual cue data, and
    wherein the visual cue graphical element for the visual cue is associated with one of the compose message field, the message window, or at least one virtual key of the virtual keyboard.

19. The method of claim 18, further comprising:
    processing, using a natural language processing (NLP) module executing on the computing device, information within the compose message field to determine whether the information within the compose message field is intended for the contact or the group of contacts; and
    generating, using the NLP module executing on the computing device, contact context data indicating that the information within the compose message field is not intended for the contact or the group of contacts, wherein the messenger module is programmed to provide the messenger application GUI with a non-intended contact graphical element to alert the user that the information within the compose message field is not intended for the contact or the group of contacts based on the contact context data.

20. A method comprising:
- outputting on a display of a device a messenger application graphical user interface (GUI) that includes a message thread between a user and one or more contacts of the user;
- processing, using a machine learning model executing on the device, information associated with the message thread to determine whether the information is intended for the one or more contacts;
- generating, using the machine learning model, contact context data indicating that the information associated with the message thread is not intended for the one or more contacts; and
- causing the display of the device to be outputted with a non-intended contact graphical element to provide an alert that the information associated with the message thread is not intended for the one or more contacts based on the contact context data,
- wherein the messenger application GUI includes a visual cue graphical element to provide a visual indication of the one or more contact and that is provided based on visual cue control generation data, the visual cue control generation data being provided in response to manipulation of one or more visual graphical rendering control elements on the display that control whether the visual cue graphical element is provided as part of the messenger application GUI.

* * * * *